US006989984B2

(12) United States Patent
Sutton et al.

(10) Patent No.: US 6,989,984 B2
(45) Date of Patent: Jan. 24, 2006

(54) PERSONAL ENTERTAINMENT DEVICE (PED) WITH DOUBLE-OPENING FLAP

(75) Inventors: Thomas Sutton, Milan (IT); Gabriele Diotti, Bollate (IT)

(73) Assignee: Flextronics AP, LLC, Niwot, CO (US)

(*) Notice: Subject to any disclaimer, the term of this patent is extended or adjusted under 35 U.S.C. 154(b) by 0 days.

(21) Appl. No.: 10/781,400

(22) Filed: Feb. 17, 2004

(65) Prior Publication Data

US 2005/0004692 A1 Jan. 6, 2005

Related U.S. Application Data

(60) Provisional application No. 60/448,982, filed on Feb. 19, 2003.

(51) Int. Cl.
*G06F 1/16* (2006.01)

(52) U.S. Cl. ...................... 361/680; 361/681; 361/683; 345/169; 455/560

(58) Field of Classification Search ................ 361/679, 361/680, 681, 682, 683; 455/556, 560, 575, 455/575.1, 161.1, 184.1, 550.01; 348/14.01, 348/14.02, 14.03, 14.04, 14.65; 345/168, 345/169, 172; 400/489, 709.1, 715; 340/7.1, 340/571, 583; 379/433.11, 433.12, 433.13, 379/433.04; 312/401, 405, 319.1–319.6, 312/307, 324, 326–329; 248/917–923
See application file for complete search history.

(56) References Cited

U.S. PATENT DOCUMENTS 4,249,734 A 2/1981 Bromley ...................... 273/94
D297,735 S 9/1988 Soren et al. ................. D14/64
D326,091 S 5/1992 Kikuchi ..................... D14/138
5,189,632 A 2/1993 Paajanen et al. ....... 364/705.05
5,278,779 A 1/1994 Conway et al. .......... 364/708.1
5,644,338 A * 7/1997 Bowen ....................... 345/168
D382,545 S 8/1997 Imai et al. ................. D14/100
5,907,615 A 5/1999 Kaschke ..................... 379/433
5,991,644 A 11/1999 Ogawa ....................... 455/566
6,122,526 A 9/2000 Parulski et al. ............. 455/556
6,297,752 B1 * 10/2001 Ni .............................. 341/22
6,466,202 B1 10/2002 Suso et al. .................. 345/169
6,510,325 B1 * 1/2003 Mack et al. ............. 455/575.2

(Continued)

FOREIGN PATENT DOCUMENTS

JP 10-215304 1/1998

(Continued)

OTHER PUBLICATIONS

Sony Ericsson P800, http://www.phonescoop.com/phones/phone.php?p=119, p. 1-3.

(Continued)

*Primary Examiner*—Michael Datskovskiy
(74) *Attorney, Agent, or Firm*—Haverstock & Owens LLP

(57) ABSTRACT

An electronic device includes three substantially planar panels. The first panel has a first side edge and a second side edge, and includes a display. The second panel includes a first interface and is hingedly coupled to the first side edge of the first panel. The third panel includes a second interface and is hingedly coupled to the second side edge of the first panel. The device is configured in at least two positions. In a first position the first interface and the second interface are obscured and in a second position the first interface and the second interface are exposed. Such a device can be a gamer with a first gaming interface and a second gaming interface, or it can be an electronic device with PDA technology through a first keyboard and a second keyboard. Alternatively, the device can be a communicator or a music player.

58 Claims, 5 Drawing Sheets

U.S. PATENT DOCUMENTS

| | | | | |
|---|---|---|---|---|
| 6,542,354 | B1 | 4/2003 | Holtorf et al. | 361/680 |
| 6,542,721 | B2 | 4/2003 | Boesen | 455/90 |
| 6,580,932 | B1 | 6/2003 | Finke-Anlauff | 455/575 |
| 6,628,508 | B2 | 9/2003 | Lieu et al. | 361/680 |
| 6,658,272 | B1 | 12/2003 | Lenchik et al. | 455/575 |
| 6,661,404 | B1 | 12/2003 | Sirola et al. | 345/168 |
| D487,066 | S | 2/2004 | Gartrell et al. | D14/138 |
| 6,731,912 | B1 | 5/2004 | Miyashita | 455/90.2 |
| 6,748,242 | B1 * | 6/2004 | Dunleavy | 455/566 |
| 6,766,182 | B2 | 7/2004 | Janninck et al. | 455/575.3 |
| 6,801,796 | B2 | 10/2004 | Finke-Anlauff | 455/575.3 |
| 2002/0006815 | A1 * | 1/2002 | Finke-Anlauff | 455/575 |
| 2002/0102946 | A1 | 8/2002 | SanGiovanni | 455/90 |
| 2002/0190952 | A1 | 12/2002 | Shah | 345/163 |
| 2003/0087663 | A1 | 5/2003 | Finke-Anlauff | 455/550 |
| 2003/0211874 | A1 | 11/2003 | Mizuta et al. | 455/575.4 |
| 2004/0097261 | A1 | 5/2004 | Ujii | 455/556.1 |
| 2004/0121825 | A1 | 6/2004 | Ma et al. | 455/575.4 |
| 2004/0121826 | A1 | 6/2004 | Ma et al. | 455/575.4 |
| 2004/0166829 | A1 | 8/2004 | Nakae et al. | 455/403 |
| 2005/0017953 | A1 * | 1/2005 | Pekka | 345/169 |
| 2005/0020323 | A1 * | 1/2005 | Kim | 455/575.1 |

FOREIGN PATENT DOCUMENTS

| | | |
|---|---|---|
| JP | P2002-158518 A | 11/2000 |

OTHER PUBLICATIONS

Sony Ericsson P900, http://www.phonescoop.com/phones/phone.php?p=403, p. 1-3.

Sierra Wireless Voq A11, http://www.phonescoop.com/phones/phone.php?p=395, p. 1-3.

Nokia 6800, http://www.phonescoop.com/phones/phone.php?p≦224, p. 1-3.

Nokia N-Gage, http://www.phonescoop.com/phones/phone.php?p=264, p. 1-3.

Sony Ericsson Z200, http://www.phonescoop.com/phones/phone.php?p=374, p. 1-3.

Danger hiptop/Sidekick, http://www.phonescoop.com/phones/phone.php?p=307, p. 1-3.

Siemens SL55, http://www.phonescoop.com/phones/phone.php?p=279, p. 1-3.

* cited by examiner

PERSONAL ENTERTAINMENT DEVICE (PED) WITH DOUBLE-OPENING FLAP

RELATED APPLICATIONS

This application claims priority under 35 U.S.C. § 119(e) of the co-pending U.S. provisional application Ser. No. 60/448,982, filed on Feb. 19, 2003 and entitled "SMARTPHONE WITH NOVEL OPENING MECHANISM AND PERSONAL ENTERTAINMENT DEVICE (PDE) WITH DOUBLE-OPENING FLAP." The provisional application Ser. No. 60/448,982, filed on Feb. 19, 2003 and entitled "SMARTPHONE WITH NOVEL OPENING MECHANISM AND PERSONAL ENTERTAINMENT DEVICE (PDE) WITH DOUBLE-OPENING FLAP" is also hereby incorporated by reference.

FIELD OF THE INVENTION

The present invention relates to the field of personal entertainment, electronic and communication devices. More particularly, the present invention relates to the field of personal entertainment devices in a compact format.

BACKGROUND OF THE INVENTION

Personal entertainment devices (PEDs) are becoming increasingly popular to meet the leisure needs of mobile consumers. PEDs are particularly useful for listening to music files, interacting with gaming systems and playing video games in a single unit. However, conventional PEDs are bulky and cumbersome resulting in a substantial footprint, since they fail to provide multiple entertainment functions in a single compact device and require space for a display, controls, and interfaces. To add to their bulk, conventional PEDs often include additional weighty protective coverings to guard against dirt, dust, external damage and the like.

What is needed is a user-friendly personal entertainment device that can provide multiple entertainment functions in a compact device. Specifically, to address the problems noted above, what is needed is a personal entertainment device that provides multiple entertainment functions in a convenient format.

SUMMARY OF THE INVENTION

To overcome the prior art, the present invention is directed to an electronic device that provides access to multiple entertainment elements, as well as a protective covering of the device, through the opening and closing of designated panels. The designated panels are also known as the flaps of the device. When the flaps are open with the device configured in a first position, the interfaces associated with those flaps are accessible. When the flaps are closed with the device configured in a second position, the interfaces associated with those flaps are not accessible.

Embodiments of the present invention include an electronic device comprising a first substantially planar panel including a display, a second panel and a third panel. The first panel has a first side edge and a second side edge. The second panel includes a first interface and is hingedly coupled to the first side edge of the first substantially planar panel. The third panel includes a second interface and is hingedly coupled to the second side edge of the first substantially planar panel. In a first position the first interface and the second interface are obscured and in a second position the first interface and the second interface are exposed. In one embodiment of the invention, when the device is in the first position, the display is partially exposed through an opening between the second panel and the third panel and in the second position the display is entirely exposed. Alternatively, when the device is in the first position, the display is obscured and in the second position the display is exposed. The device can be a gamer, a personal digital assistant (PDA), a communicator, or a music player that can play audio files and audio visual files, including MP3 files.

According to another embodiment of the invention, the device operates in a first mode when it is configured in the first position, and the device operates in a second mode when it is configured in the second position. The first substantially planar panel of the device can be operatively coupled to both the second panel and the third panel to allow an exchange of electronic data signals between the device and the second and third panels.

In yet another embodiment of the invention, the device is a portable handheld device. Preferably, the device is an entertainment device. Alternatively, the device is a music listening device.

According to another embodiment of the invention, the device further comprises a third interface. Preferably, the third interface is a music listening interface, such as for MP3 music files, such that the device can play music while the flaps are closed when the device is in the first position. Also preferably, the third interface is on the opposite face from the first interface. A portion of the display can be visible between the second panel and the third panel in the first position. In yet another embodiment of the invention, the device includes a connector configured to couple the device to an apparatus. The connector can be included on a third side edge of the first substantially planar panel of the device. According to yet another embodiment of the present invention, the third interface is included on a third side edge of the first substantially planar panel. The device can be a gamer, a personal digital assistant (PDA), a communicator, or a music player that can play audio files and audio visual files, including MP3 and .mpeg files. In the preferred embodiment, the third interface controls the display when the device is configured in the first position.

In another embodiment of the invention, when the electronic device is configured in the first position, no interface controls the display and when the device is configured in the second position the device is selectively controllable by the first interface alone, the second interface alone, and both the first interface and the second interface. Alternatively, when the device is configured in the second position, an entry made on the first interface is displayed on the display. In another embodiment of the invention, when the device is configured in the second position, an entry made on the second interface is displayed on the display. Alternatively, when the device is configured in the second position, entries made on both the first interface and the second interface are displayed on the display. The device can be a gamer, a personal digital assistant (PDA), a communicator, or a music player that can play digital files including MP3 files.

DETAILED DESCRIPTION OF THE PRESENT INVENTION

The present invention provides the convenience of a multifunctional personal entertainment device (PED) in a more compact, protective format, with a reduced footprint. This invention advantageously has a built-in protective covering and allows for multiple entertainment interfaces to be simultaneously accessible in one easy motion. Furthermore, this invention provides these advantages without sacrificing the benefits of its portability and user-friendly layout.

Specifically, to address the problems in bulkiness of conventional PEDs, a device in accordance with the present invention comprises a first substantially planar panel, a second substantially planar panel, and a third substantially planar panel. The first substantially planar panel includes a display and has a first side edge and a second side edge. The second panel includes a first interface and is hingedly coupled to the first side edge of the first substantially planar panel. The third panel includes a second interface and is hingedly coupled to the second side edge of the first substantially planar panel.

The electronic device is configured in one of two positions. In a first position (the closed position), the second panel and the third panel are folded onto the first panel, reducing the footprint of the device. When in the first position, the device is more portable and compact. In the first position, the first interface and the second interface are obscured and are therefore protected from the potential risks of dust, dirt, external damage, and the like. Preferably, the first interface is included on the front side of the second panel and the second interface is included on the front side of the third panel. Because the first interface and the second interface are obscured in the first position, they are also not accessible. In contrast, when the device is configured in a second position (the open position), the second panel and the third panel are unfolded about hinges from the first panel. The first interface and the second interface are exposed and therefore accessible. In the preferred embodiment, when the device is in the second position, the first interface and the second interface are simultaneously accessible and they both control the display.

According to the preferred embodiment of the present invention, in the first position, the device operates as a music player. It will be appreciated, however, that in the first position, the electronic device can operate as any electronic device, such as a gamer, a communicator, a PDA, a web browser, and the like. In accordance with the preferred embodiment, the second panel includes a third interface on an opposite face from the first interface. The third interface is preferably a music listening interface, such as for MP3 music files, such that the device can play music while the flaps are closed and the device is in the first position.

Figure 1A:
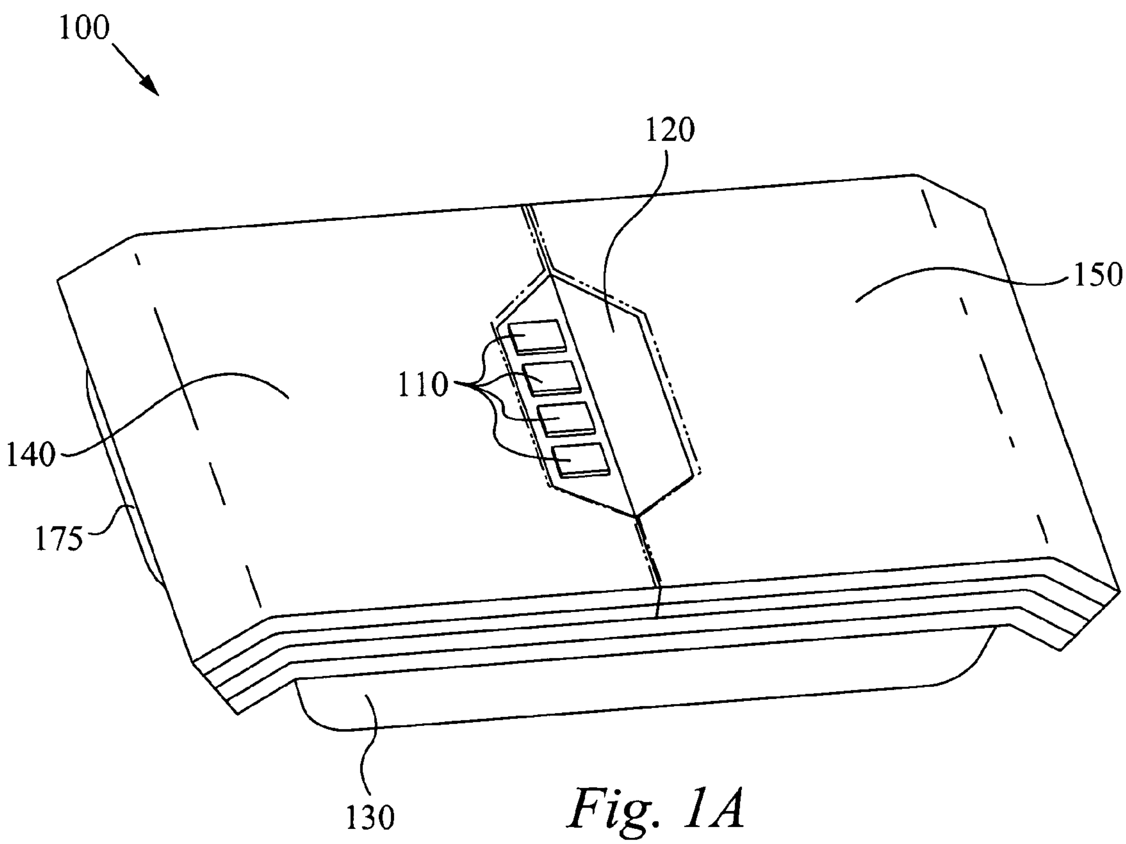
FIGS. 1A, 1B and 1C are schematic drawings of an electronic device in accordance with the present invention, showing a music listening interface on various panels of the electronic device configured in a first position.
Figure 1B:
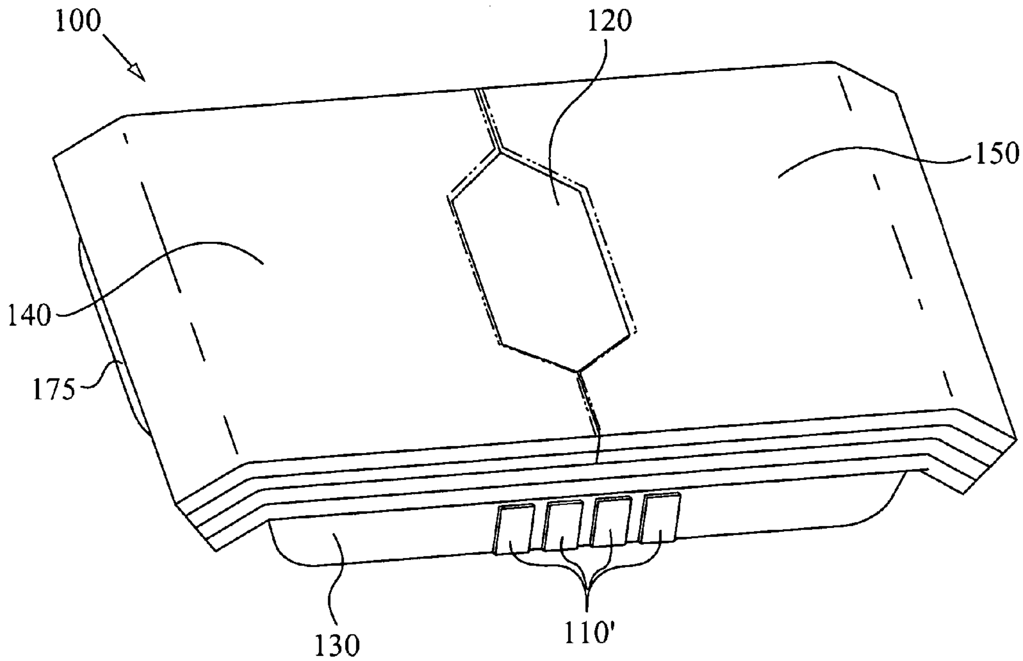
Figure 1C:
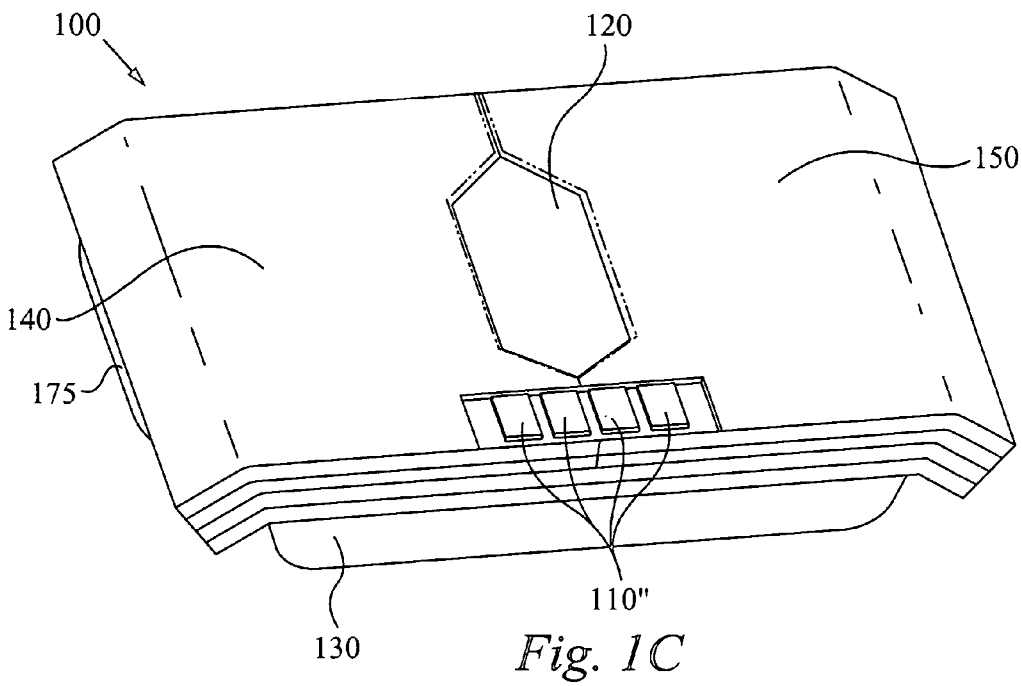
Figure 2A:
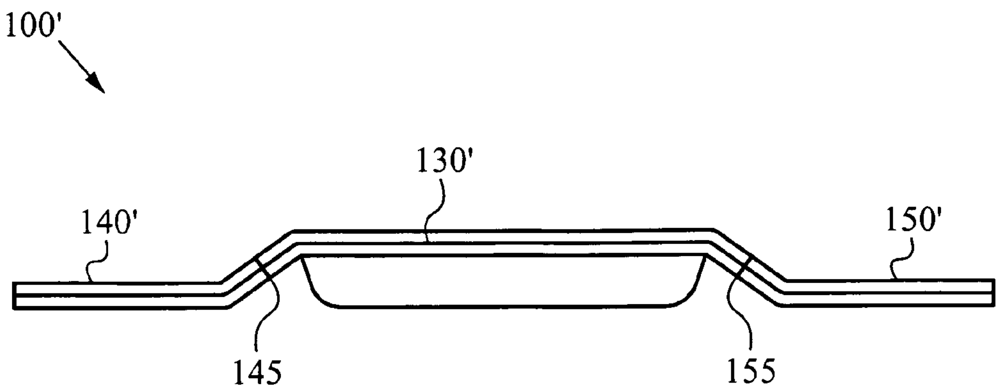
FIGS. 2A and 2B are schematic drawings of the side view and the top view, respectively, of the device of FIG. 1A configured in a second position.
Figure 2B:
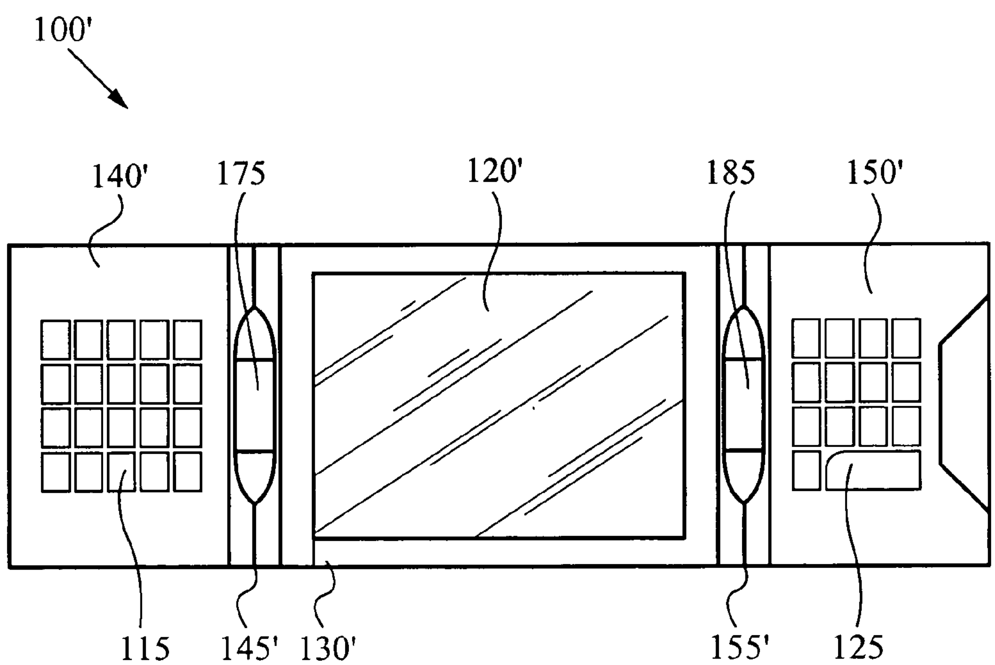

FIGS. 1A, 1B, and 1C all show an electronic device 100 in a first position. The device 100 is a portable handheld device. In one embodiment, the device 100 is an entertainment device. When the device 100 is in the first position, a display 120 on a first substantially planar panel 130 can be seen through an opening between a second substantially planar panel 140 and a third substantially planar panel 150 of the device 100. The positions of the device 100, 100' coincide with the modes of the device 100, 100'. In the preferred embodiment, when the device 100, 100' includes a music listening interface and the device 100, 100' is configured in the first position (closed position), the device 100, 100' is in the first mode, which is also known as the music player mode (FIGS. 1A, 1B, and 1C). In the preferred embodiment, when the device 100, 100' is configured in the second position (open position) the device 100, 100' is in the second mode (FIGS. 2A and 2B). The device 100, 100' also senses when it is in one of the first position and the second position. In one embodiment, the first panel 130 of the device 100, 100' is operatively coupled to the second panel 140 and the third panel 150 to allow an exchange of electronic data.

Referring to FIGS. 1A, 1B, and 1C, when the device 100, 100' is configured in the first position, in the preferred embodiment, the device 100 can play music video files, such that audio can be heard in real time with visual segments playing on the display 120. Preferably the device 100, 100' is a music listening device. It will be appreciated that the device 100, 100' can play audio files with the display 120 powered off. In the preferred embodiment of the invention, when the device 100, 100' is configured in the first position, the display 120 is partially exposed through an opening between the second panel 140 and the third panel 150. Alternatively, the display 120 is completely obscured when the device 100, 100' is in the first position.

Turning to FIG. 1A, in the preferred embodiment, a music listening interface 110 as a third interface can be included on the back side of the second panel 140. Preferably, the music listening interface 110 is on an opposite face from the first interface (not shown). When the device 100 is in the first position, the music listening interface 110 controls the display 120 and the device 100 (FIGS. 1A, 1B, and 1C). In FIG. 1A, the music listening interface 110 is exposed while the device 100 is in the first position. Alternatively, as shown in FIG. 1B, the music listening interface 110' can be included on a side edge of the first substantially planar panel 130. In yet another alternative embodiment of the invention, the music listening interface 110" is included on a face of the first substantially planar panel 130 (FIG. 1C). As shown in FIG. 1C, in this alternative embodiment, the music listening interface 110" is included on the front face of the first substantially planar panel 130 below the display 120.

FIGS. 2A and 2B show the device 100' in a second position from a side view and a top view, respectively. As previously described, the second position is also referred to as the open position, since both the second panel 140' and the third panel 150' are open with the front sides of both the second panel 140' and the third panel 150' accessible. As depicted in FIG. 2A, when the device 100' is in the second position, the second panel 140' and the third panel 150' are unfolded about hinges from the first panel 130'. Thus, as shown in FIG. 2B, when the device 100' is in the second position, the first interface 115 and the second interface 125 are accessible, because the first interface 115 and the second interface 125 are included on the front sides of the second panel 140' and the third panel 150'. When the device 100' is configured in the second position, the device 100' is selectively controllable by the first interface 115 alone, the second interface 125 alone, and both the first interface 115 and the second interface 125. Furthermore, when the device 100' is in the second position, the display 120' of the first substantially planar panel 130' is exposed.

As shown in FIGS. 2A and 2B, when the device 100' is configured in the second position, an entry made on the first interface 115 is displayed on the display 120'. An entry can include keystrokes entered on a numeric or alphabetic keypad, as described below, a movement of a joystick, a movement on a touch keypad, a movement of a scroll bar and the like. Alternatively, in the second position, an entry made on the second interface 125 is displayed on the display 120'. In yet another embodiment, entries made on either or both the first interface 115 and the second interface 125 are displayed on the display 120'.

As shown by FIGS. 2A (side view) and 2B (top view), the second panel 140' is attached to a first side edge 145, 145' of the first substantially planar panel 130' by a first hinged coupler 175. Likewise, the third panel 150' is coupled to the second side edge 155, 155' of the first substantially planar panel 130' by a second hinged coupler 185. The first hinged coupler 175 and the second hinged coupler 185 allow for the second panel 140' and the third panel 150', respectively, to open and close relative to the device 100'. As described previously, the front sides of both the second panel 140' and the third panel 150' are accessible when the device 100' is in the second position (FIGS. 2A and 2B). With the front sides of both the second panel 140' and the third panel 150' being accessible in the second position, the first interface 115 and the second interface 125 are also accessible. In one embodiment of the present invention, if the music listening interface 110" is located on the first substantially planar panel 130', the music listening interface 110" is also accessible when the device 100' is configured in the second position (FIG. 3A).

The electronic device 100' shown in FIGS. 2A and 2B can have different types of multiple interfaces on the second panel 140' and the third panel 150', which are more clearly delineated when the device 100' is configured in the second position (open position). For example, as FIG. 3A illustrates, in one embodiment of the invention, the device 100' in the second position can be an entertainment device with a first gaming interface 210 and a second gaming interface 220. Such an entertainment device is preferably a portable handheld device. Here, in FIG. 3A, the front side of the second panel 140' includes the first gaming interface 210 and the front side of the third panel 150' includes a second gaming interface 220. When the device 100' is in the second position, the first gaming interface 210, the second gaming interface 220, and the display 120' are accessible. If the music listening interface 110" is on the first substantially planar panel 130', as shown in FIG. 3A, the music listening interface 110" is also accessible when the electronic device 100' is configured in the second position. Alternatively, the music listening interface 110' is on a side edge of the first substantially planar panel 130 as a third interface (FIG. 1B). Preferably, the music listening interface 110 is on the back side of the second panel 140, opposite from the first interface (not shown) (FIG. 1A).

Figure 3A:
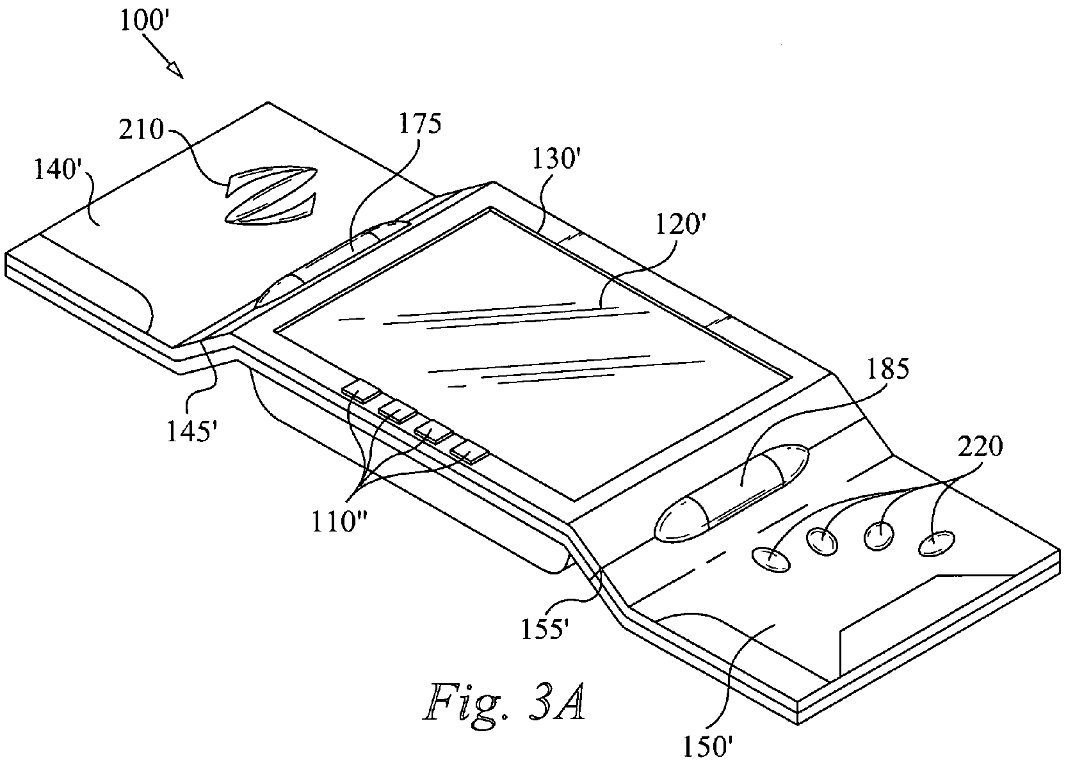
FIGS. 3A and 3B are schematic drawings of the device of FIG. 1A configured in a second position, coupled to various peripheral devices, respectively.

Still referring to FIG. 3A, as described previously, the second panel 140' is coupled to the first side edge 145' of the first substantially planar panel 130' by the first hinged coupler 175. The third panel 150' is coupled to a second side edge 155' of the first substantially planar panel 130' by a second hinged coupler 185. The embodiment shown in FIG. 3A is called the gamer configuration. Preferably, the first panel 130' is operatively coupled to the second panel 140' and the third panel 150' to allow an exchange of electronic data. When the device 100' is in the second position with the first gaming interface 210 and the second gaming interface 220 accessible, the second mode for this embodiment is called the gamer mode. Thus, the device 100, 100' switches from the first mode (the music player mode shown on FIGS. 1A, 1B, and 1C) to the second mode (the gamer mode as shown on FIG. 3A) when the device 100, 100' moves from the first position (FIGS. 1A, 1B, and 1C) to the second position (FIG. 3A). In the preferred embodiment, when the device 100, 100' includes a music listening interface 110, 100', 110", and the device 100, 100' is configured in the first position (FIGS. 1A, 1B, and 1C), the device 100, 100' is controllable by the music listening interface 110, 110', 110". In the preferred embodiment, when the device 100, 100' is configured in the second position (FIG. 3A) the device 100, 100' is selectively controllable by the first gaming interface 210 alone, the second gaming interface 220 alone, and both the first gaming interface 210 and the second gaming interface 220.

In another embodiment of the gamer configuration, when the device 100, 100' is configured in the first position (FIGS. 1A, 1B, and 1C), an entry made on the music listening interface 110, 110', 110" is displayed on the display 120, 120' and when the device 100, 100' is configured in the second position (FIG. 3A), an entry made on the first gaming interface 210 is displayed on the display 120, 120'. In yet another embodiment of the gamer configuration, when the device 100, 100' is configured in the first position (FIGS. 1A, 1B, and 1C), an entry made on the music listening interface 110, 110, 110" is displayed on the display 120, 120' and when the device 100, 100' is configured in the second position (FIG. 3A), an entry made on the second gaming interface 220 is displayed on the display 120, 120'. In the preferred embodiment, when the device 100, 100' is configured in the first position (FIGS. 1A, 1B, and 1C) an entry made on the music listening interface 110, 110', 110" is displayed on the display 120, 120' and when the device 100, 100' is configured in the second position (FIG. 3A), entries made on both the first gaming interface 210 and the second gaming interface 220 are displayed on the display 120, 120'.

In the preferred embodiment of the gamer configuration, when the device 100, 100' is in the first position (FIGS. 1A, 1B, and 1C), the display 120, 120' is partially exposed through an opening between the second panel 140 and the third panel 150, and when the device 100, 100' is configured in the second position (FIG. 3A), the display 120, 120' is entirely exposed. Alternatively, wherein the device 100, 100' is configured in the first position, the display 120, 120' is completely obscured and when the device 100, 100' in the second position, the display 120, 120' is exposed.

Figure 3B:
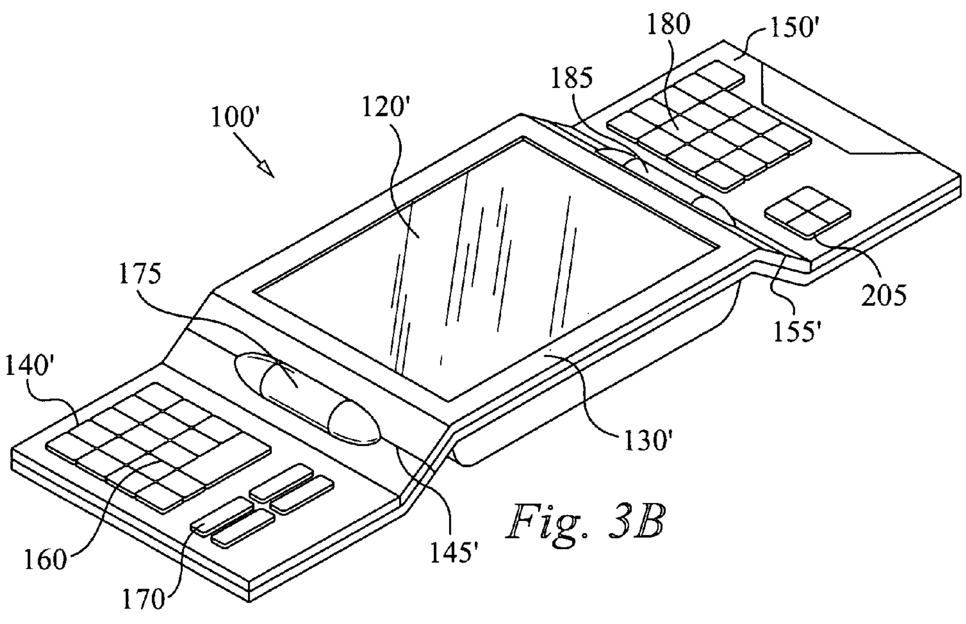

Turning to FIG. 3B, another embodiment of the present invention is an electronic device 100' with a first keyboard 160 and a second keyboard 180. This configuration is referred to as the PDA (personal digital assistant) configuration. When the device 100' is configured in the second position with the first keyboard 160 and the second keyboard 180 accessible, as shown in FIG. 3B, the second mode for this embodiment is called the data entry mode. Thus, the device 100, 100' switches from the first mode (the music player mode shown on FIGS. 1A, 1B, and 1C) to the second mode (the data entry mode as shown on FIG. 3B) when the device 100, 100' moves from the first position (FIGS. 1A, 1B, and 1C) to the second position (FIG. 3B). Alternatively, in the PDA configuration, the second mode can be called the PDA game play mode when the first keyboard 160 and the second keyboard 180 are used to play a video game on the display 120' or to control a gaming system coupled to the device 100'. Alternatively, the second mode can be called the web surfing mode when the device 100' includes a connection to a hub or a network to allow for internet connection. In the web surfing mode, the first keyboard 160 and the second keyboard 180 are used to browse through the world wide web displayed on the display 120'.

As FIG. 3B shows, the front sides of both the second panel 140' and the third panel 150' are accessible, along with the display 120'. In this embodiment, the front side of the second panel 140' further includes the first keyboard 160, preferably with function keys 170. Also, the front side of the third panel 150' further includes a second keyboard 180, preferably with control buttons 205. Preferably, the first keyboard 160 and the second keyboard 180 can be full alphabetical keyboards. Alternatively, the first keyboard 160 and the second keyboard 180 can be two halves of one qwerty keyboard. Alternatively, the first keyboard 160 can be a cursor control keypad and the second keyboard 180 can be a full qwerty keyboard.

Similar to the gamer configuration, as shown in FIG. 3B, the device 100' in the PDA configuration has the second panel 140' coupled to a first side edge 145' of the first substantially planar panel 130' by a first hinged coupler 175. Likewise, the third panel 150' is coupled to a second side edge 155' of the first substantially planar panel 130' by a second hinged coupler 185. It will be appreciated that the electronic device 100' in FIG. 3B can include the music listening interface 110" on the front side of the first substantially planar panel 130' as shown in FIG. 1C. Alternatively, the music listening interface 110' can be included on a side of the first substantially planar panel 130 as a third interface (FIG. 1B). Alternatively, the music listening interface 110 can be included on the back side of the second panel 140 (FIG. 1A).

In an embodiment of the PDA configuration, when the device 100, 100' is configured in the first position (FIGS. 1A, 1B, and 1C), the display 120, 120" is partially exposed through an opening between the second panel 140 and the third panel 150 and when the device 100, 100' is configured in the second position (FIG. 3B), the display 120, 120' is entirely exposed. Alternatively, when the device 100, 100' is configured in the first position, the display 120, 120' is completely obscured and when the device 100, 100' is configured in the second position, the display 120, 120' is exposed. In yet another embodiment of the present invention, When the device 100, 100' is configured in the first position (FIGS. 1A, 1B, and 1C), the device 100, 100' is controllable by the music listening interface 110, 110', 110" and when the device 100, 100' is configured in the second position (FIG. 3B), the device 100, 100' is selectively controllable by the first keyboard 160 alone, the second keyboard 180 alone, and both the first keyboard 160 and the second keyboard 180.

In another embodiment of the PDA configuration, when the device 100, 100' is configured in the first position (FIGS. 1A, 1B, and 1C) an entry made on the music listening interface 110, 110', 110" is displayed on the display 120, 120' and when the device 100, 100' is configured in the second position (FIG. 3B), an entry made on the first keyboard 160 is displayed on the display 120, 120'. Alternatively, when the device 100, 100' is configured in the first position (FIGS. 1A, 1B, and 1C), an entry made on the music listening interface 110, 110', 110" is displayed on the display 120, 120' and when the device 100, 100' is configured in the second position (FIG. 3B), an entry made on the second keyboard 180 is displayed on the display 120, 120'. Preferably, when the device 100, 100" is configured in the first position (FIGS. 1A, 1B, and 1C), an entry made on the music listening interface 110, 110', 110" is displayed on the display 120, 120' and when the device 100, 100' is configured in the second position (FIG. 3B), entries made on both the first keyboard 160 and the second keyboard 180 are displayed on the display 120, 120'.

Figure 4A:
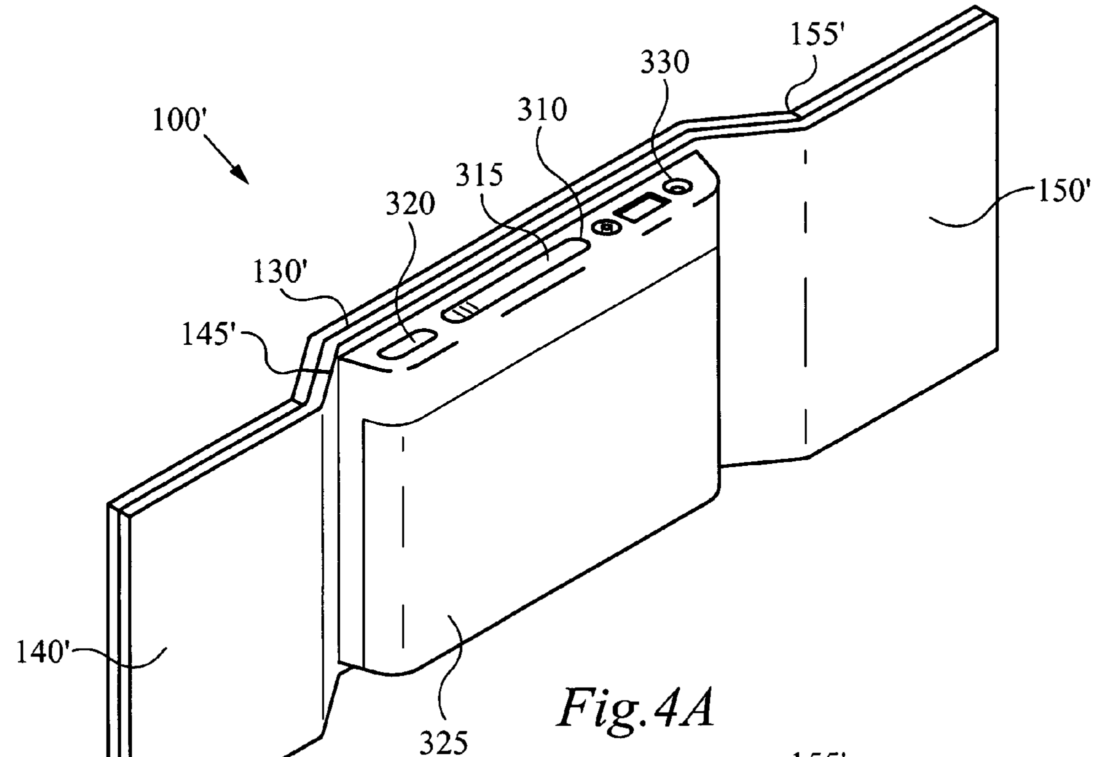
FIGS. 4A and 4B are schematic drawings showing side views of the device of FIG. 1A in the second position, with the third side edge of the electronic device having a connector and a third interface, respectively.
Figure 4B:
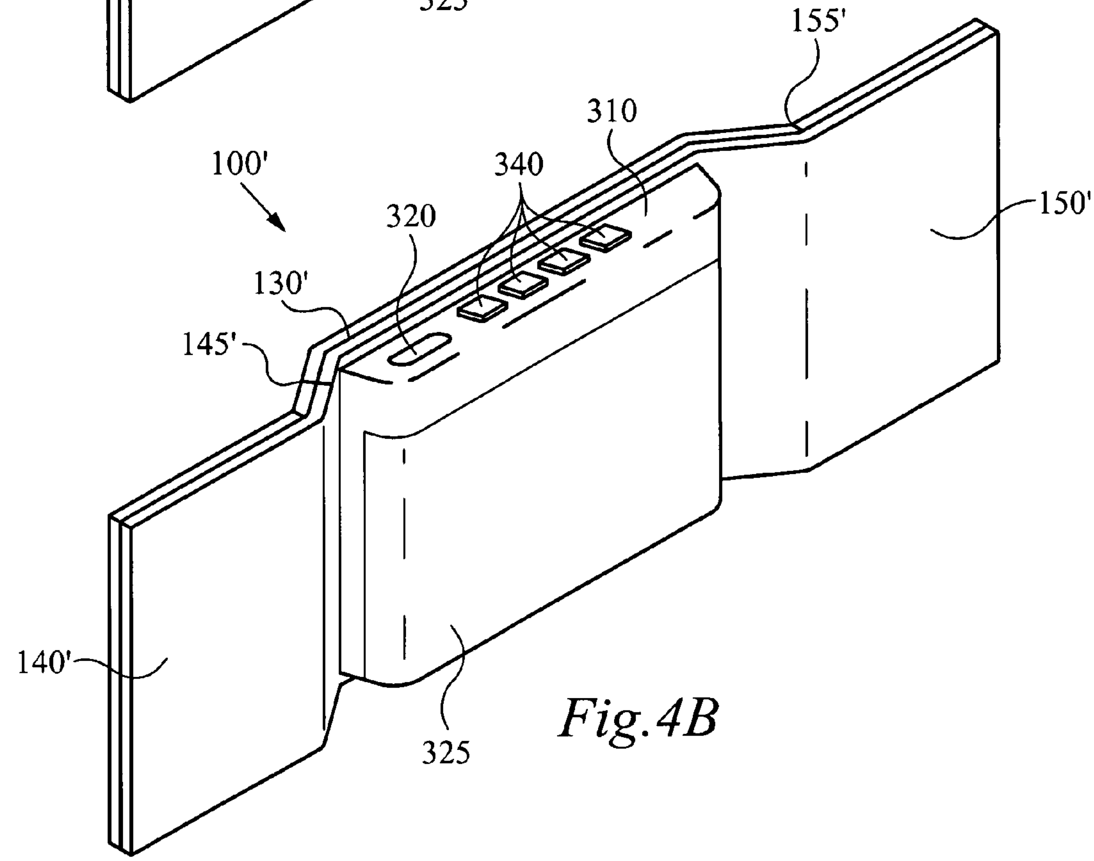

Turning now to FIGS. 4A and 4B, the electronic device 100' is shown in the second position (the open position) from a back view with a third side edge 310 on top. In FIGS. 4A and 4B, the electronic device 100' can have the gamer configuration (FIG. 3A) or the PDA configuration (FIG. 3B). FIGS. 4A and 4B still have many of the same elements shown in FIG. 2B of the device 100' in the second position. FIGS. 4A and 4B show that the first substantially planar panel 130' is accessible when the device 100' is configured in the second position. Also, the second panel 140' is hingedly coupled to the first side edge 145' of the first substantially planar panel 130', while the third panel 150' is hingedly coupled to the second side edge 155' of the first substantially planar panel 130'. As shown on FIG. 4A, the third side edge 310 of the electronic device 100' further includes a connector 320 to electronically, mechanically, or optically couple the device 100' to an apparatus. The apparatus could be an entertainment system, a separate gaming system, a speaker, a cellular phone, a cellular phone headset, a digital camera, a personal digital assistant, a joystick, a computer, e-mail system, and the like. Furthermore, the device 100' can be a communicator and include a wireless or wired connection to a hub or a network to allow cellular phone call transmission. As a communicator, the device 100' may include the cellular phone headset coupled to the device 100' through the connector 320 on the third side edge 310.

Still referring to FIG. 4A, the third side edge 310 can further contain an adapter 330. The adapter 330 could be for additional power supply. The device 100' can further include a battery panel to insert batteries. Preferably, the back side 325 of the first substantially planar panel 130' (FIG. 4A) can include a battery panel. Also, the third side edge 310 can further include a slot 315 to couple a separate gaming system or slide a video game cartridge into the device 100' for entertainment purposes. The slot 315 then allows for the device 100' to act as a specialized joystick or controller for a separate gaming system.

Alternatively, as shown on FIG. 4B, the third side edge 310 of the electronic device 100' can include a third interface 340. The third interface 340 can be a third gaming interface for the gamer configuration (FIG. 3A). Alternatively, the third interface 340 can be a third keyboard for the PDA configuration (FIG. 3B). Alternatively, the third interface 340 can be a music listening interface. The available options for the third interface 340 can further enhance the capabilities of the electronic device 100'.

Still referring to FIG. 4B, the connector 320 can be present on the third side edge 310 of the first substantially planar panel 130', with the connector 320 being used to couple the device 100' to an apparatus, such as an entertainment system, a separate gaming system, a speaker, a cellular phone, a cellular phone headset, a digital camera, a personal digital assistant, a joystick, a computer, and the like. Such a connector further expands the functionality of the electronic device 100'. It will be appreciated that the slot 315, the adapter 330, and the battery panel 325 of FIG. 4A can also be present in the embodiment shown in FIG. 4B.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. An electronic device comprising:
a. a first substantially planar panel including a display, the first panel having a first side edge and a second side edge;
b. a second substantially planar panel including a first interface, the second panel hingedly coupled to the first side edge of the first substantially planar panel; and
c. a third substantially planar panel including a second interface, the third panel hingedly coupled to the second side edge of the first substantially planar panel, wherein in a first position the first interface and the second interface are obscured and in a second position the first interface and the second interface are exposed, and further wherein in the first position, the display is partially exposed through an opening between the second panel and the third panel and in the second position, the display is entirely exposed.

2. The device according to claim 1, wherein when the device is configured in the first position, no interface controls the display and when the device is configured in the second position the device is selectively controllable by the first interface alone, the second interface alone, and both the first interface and the second interface.

3. The device according to claim 1, wherein when the device is configured in the second position, an entry made on the first interface is displayed on the display.

4. The device according to claim 1, wherein when the device is configured in the second position, an entry made on the second interface is displayed on the display.

5. The device according to claim 1, wherein when the device is configured in the second position, entries made on both the first interface and the second interface are displayed on the display.

6. The device according to claim 1, wherein the device operates in a first mode when configured in the first position and operates in a second mode when configured in the second position.

7. The device according to claim 1, wherein the first substantially planar panel is operatively coupled to the second panel and the third panel to allow an exchange of electronic data.

8. The device according to claim 1, wherein the device is a portable handheld device.

9. The device according to claim 1, wherein the device is an entertainment device.

10. The device according to claim 1, wherein the device is a music listening device.

11. The device according to claim 1, wherein the device includes a connector configured to couple the device to an apparatus.

12. The device according to claim 1, wherein the device further comprises a third interface.

13. The device according to claim 12, wherein the third interface is a music listening interface.

14. The device according to claim 12, wherein the second panel further includes the third interface.

15. The device according to claim 12, wherein when the device is configured in one of the first position and the second position, the third interface is exposed.

16. The device according to claim 12, wherein when the device is configured in the first position, the third interface controls the display.

17. An entertainment device comprising:
a. a first substantially planar panel including a display, the first panel having a first side edge, a second side edge, and a third side edge;
b. a second panel including a first gaming interface, the second panel hingedly coupled to the first side edge of the first substantially planar panel;
c. a third panel including a second gaming interface, the third panel hingedly coupled to the second side edge of the first substantially planar panel; and
d. a music listening interface on the third side edge of the first substantially planar panel, wherein in a first position the first gaming interface and the second gaming interface are obscured and in a second position the first gaming interface and the second gaming interface are exposed.

18. The entertainment device according to claim 17, wherein in the first position, the display is partially exposed through an opening between the second panel and the third panel and in the second position, the display is entirely exposed.

19. The entertainment device according to claim 17, wherein in the first position, the display is completely obscured and in the second position, the display is exposed.

20. The entertainment device according to claim 17, wherein when the device is configured in the first position, the device is controllable by the music listening interface and when the device is configured in the second position the device is selectively controllable by the first gaming interface alone, the second gaming interface alone, and both the first gaming interface and the second gaming interface.

21. The entertainment device according to claim 17, wherein when the device is configured in the first position an entry made on the music listening interface is displayed on the display and when the device is configured in the second position an entry made on the first gaming interface is displayed on the display.

22. The entertainment device according to claim 17, wherein when the device is configured in the first position an entry made on the music listening interface is displayed on the display and when the device is configured in the second position, an entry made on the second gaming interface is displayed on the display.

23. The entertainment device according to claim 17, wherein when the device is configured in the first position an entry made on the music listening interface is displayed on the display and when the device is configured in the second position, entries made on both the first gaming interface and the second gaming interface are displayed on the display.

24. The entertainment device according to claim 17, wherein the device operates in a first mode when configured in the first position and operates in a second mode when configured in the second position.

25. The entertainment device according to claim 24, wherein the first mode is music player mode and the second mode is gamer mode.

26. The entertainment device according to claim 17, wherein the first substantially planar panel is operatively coupled to the second panel and the third panel to allow an exchange of electronic data.

27. The entertainment device according to claim 17, wherein the device is a portable handheld device.

28. The entertainment device according to claim 17, wherein the device includes a connector configured to couple the device to an apparatus.

29. The entertainment device according to claim 28, wherein the connector is included on a third side edge of the first substantially planar panel.

30. An electronic device comprising:

a. a first substantially planar panel including a display, the first panel having a first side edge, a second side edge, and a third side edge;

b. a second panel including a first keyboard, the second panel hingedly coupled to the first side edge of the first substantially planar panel;

c. a third panel including a second keyboard, the third panel hingedly coupled to the second side edge of the first substantially planar panel; and d. a music listening interface on the third side edge of the first substantially planar panel, wherein in a first position the first keyboard and the second keyboard are obscured and in a second position the first keyboard and the second keyboard are exposed.

31. The device according to claim 30, wherein in the first position, the display is partially exposed through an opening between the second panel and the third panel and in the second position, the display is entirely exposed.

32. The device according to claim 30, wherein in the first position, the display is completely obscured and in the second position, the display is exposed.

33. The device according to claim 30, wherein when the device is configured in the first position, the device is controllable by the music listening interface and when the device is configured in the second position the device is selectively controllable by the first keyboard alone, the second keyboard alone, and both the first keyboard and the second keyboard.

34. The device according to claim 30, wherein when the device is configured in the first position an entry made on the music listening interface is displayed on the display and when the device is configured in the second position, an entry made on the first keyboard is displayed on the display.

35. The device according to claim 30, wherein when the device is configured in the first position an entry made on the music listening interface is displayed on the display and when the device is configured in the second position, an entry made on the second keyboard is displayed on the display.

36. The device according to claim 30, wherein when the device is configured in the first position an entry made on the music listening interface is displayed on the display and when the device is configured in the second position, entries made on both the first keyboard and the second keyboard are displayed on the display.

37. The device according to claim 30, wherein the device operates in a first mode when configured in the first position and operates in a second mode when configured in the second position.

38. The device according to claim 37, wherein the first mode is music player mode and the second mode is data entry mode.

39. The device according to claim 30, wherein the first substantially planar panel is operatively coupled to the second panel and the third panel to allow an exchange of electronic data.

40. The device according to claim 30, wherein the device is a portable handheld device.

41. The device according to claim 30, wherein the device includes a connector configured to couple the device to an apparatus.

42. The device according to claim 41, wherein the connector is included on a third side edge of the first substantially planar panel.

43. The device according to claim 30, wherein the first keyboard and the second keyboard are both qwerty keyboards.

44. The device according to claim 30, wherein the device further comprises function keys.

45. The device according to claim 12, wherein the third interface is included on a back side of the second panel.

46. The device according to claim 1, wherein the device is a cellular phone.

47. The entertainment device according to claim 17, wherein the device is a cellular phone.

48. The device according to claim 30, wherein the device is a cellular phone.

49. An entertainment device comprising:

a. a first substantially planar panel including a display, the first panel having a first side edge and a second side edge;

b. a second panel including a first gaming interface, the second panel hingedly coupled to the first side edge of the first substantially planar panel;

c. a third panel including a second gaming interface, the third panel hingedly coupled to the second side edge of the first substantially planar panel; and d. a music listening interface, wherein in a first position the first gaming interface and the second gaming interface are obscured and in a second position the first gaming interface and the second gaming interface are exposed, and further wherein in the first position, the display is partially exposed through an opening between the second panel and the third panel and in the second position, the display is entirely exposed.

50. The entertainment device according to claim 49, wherein the device is a cellular phone.

51. The entertainment device according to claim 49, wherein the music listening interface is included on a face of the first substantially planar panel.

52. The entertainment device according to claim 49, wherein the music listening interface is included on a back side of the second panel.

53. The entertainment device according to claim 49, wherein the music listening interface is included on a third side edge of the first substantially planar panel.

54. An electronic device comprising:

a. a first substantially planar panel including a display, the first panel having a first side edge and a second side edge;

b. a second panel including a first keyboard, the second panel hingedly coupled to the first side edge of the first substantially planar panel;

c. a third panel including a second keyboard, the third panel hingedly coupled to the second side edge of the first substantially planar panel; and d. a music listening interface, wherein in a first position the first keyboard and the second keyboard are obscured and in a second position the first keyboard and the second keyboard are exposed, and further wherein in the first position, the display is partially exposed through an opening between the second panel and the third panel and in the second position, the display is entirely exposed.

55. The device according to claim 54, wherein the device is a cellular phone.

56. The device according to claim 54, wherein the music listening interface is included on a face of the first substantially planar panel.

57. The device according to claim 54, wherein the music listening interface is included on a back side of the second panel.

58. The device according to claim 54, wherein the music listening interface is included on a third side edge of the first substantially planar panel.

* * * * *